US009342746B1

(12) United States Patent
Ganguli et al.

(10) Patent No.: US 9,342,746 B1
(45) Date of Patent: May 17, 2016

(54) MANEUVERLESS PASSIVE RANGE ESTIMATION USING MONOCULAR IMAGE SEQUENCES

(75) Inventors: Anurag Ganguli, Los Angeles, CA (US); Sharath Avadhanam, Los Angeles, CA (US); Abhishek Tiwari, Cypress, CA (US); Joseph Yadegar, Santa Monica, CA (US); He Bai, Los Angeles, CA (US); Jason Newton, Los Angeles, CA (US)

(73) Assignee: UtopiaCompression Corporation, Los Angeles, CA (US)

( * ) Notice: Subject to any disclaimer, the term of this patent is extended or adjusted under 35 U.S.C. 154(b) by 483 days.

(21) Appl. No.: 13/420,964

(22) Filed: Mar. 15, 2012

Related U.S. Application Data (60) Provisional application No. 61/465,295, filed on Mar. 17, 2011.

(51) Int. Cl.
*H04N 7/18* (2006.01)
*G06K 9/00* (2006.01)

(52) U.S. Cl.
CPC .................. *G06K 9/00805* (2013.01)

(58) Field of Classification Search
USPC .......................................................... 348/148
See application file for complete search history.

(56) References Cited

U.S. PATENT DOCUMENTS

| 5,867,256 | A | 2/1999 | Van Rheeden | |
|---|---|---|---|---|
| 2007/0154068 | A1 | 7/2007 | Stein et al. | |
| 2008/0095402 | A1* | 4/2008 | Kochi et al. | 382/103 |
| 2009/0252377 | A1* | 10/2009 | Akita et al. | 382/106 |
| 2010/0027844 | A1* | 2/2010 | Akita | 382/103 |
| 2010/0296705 | A1* | 11/2010 | Miksa et al. | 382/106 |
| 2011/0012719 | A1* | 1/2011 | Hilger et al. | 340/435 |
| 2011/0178658 | A1 | 7/2011 | Kotaba et al. | |

OTHER PUBLICATIONS

Gandhi, T., Yang, M.-T., Kasturi, R., Camps, O., Coraor, L., and McCandless, J., "Detection of Obstacles in the Flight Path of an Aircraft", IEEE Transactions on Aerospace and Electronic Systems, vol. 39, No. 1, Jan. 2003.

Utt, J., McCalmont, and Deschenes, M., "Development of a Sense and Avoid System", American Institute of Aeronautics and Astronautics, infotech@aerospace, Sep. 2005.

Hammel, S. and Aidala, V., "Observability Requirements for Three-Dimensional Tracking via Angle Measurements", IEEE Transactions on Aerospace and Electronic Systems, vol. AES-21, No. 2, Mar. 1985.

Payne, A., "Observability problem for bearings-only tracking", International Journal of Control, 49:3, 761-768, 1989, http://dx/doi.org/10.1080/00207178908559665.

(Continued)

*Primary Examiner* — Tracy Li
(74) *Attorney, Agent, or Firm* — Barlow, Josephs & Holmes, Ltd.

(57) ABSTRACT

A method to estimate range to a moving rigid body from a moving platform using a monocular camera. The method does not require the camera platform to maneuver in order to estimate range. The method relies on identification and tracking of certain principal features of the object. The method extracts a silhouette of an object from an obtained image and identifies two principal linear components of the silhouette. A normalized distance between the point of intersection of the two linear components and a centroid of the silhouette is computed, compared to a data set and used to determine a direction of movement of the object.

22 Claims, 7 Drawing Sheets

(56) References Cited

OTHER PUBLICATIONS

Lindgren, A. and Gong, K. F.; "Position and Velocity Estimation Via Bearing Observations", IEE Transactions on Aerospace and Electronic Systems, vol. AES14, No. 4 Jul. 1978 pp. 564-579.

Nardone, S. C. and Aidala, V. J.; "Observability Criteria for Bearings-Only Target Motion Analysis", IEEE Transactions on Aerospace and Electronic Systems, vol. AES-17, No. 2 Mar. 1981 pp. 162-166.

Aidala, V. J. and Hammel, S. E.; "Utilization of Modified Polar Coordinates for Bearings-Only Tracking", IEEE Transactions on Automatic Control, vol. AC-28, No. 3 Mar. 1983 pp. 283-292.

Shakernia, O., Cheen, W. Z., Raska, V. M.; "Passive Ranging for UAV Sense and Avoid Applications", Infotech@Aerospace, American Institute of Aeronautics and Astronautics, Arlington, VA Sep. 2005 pp. 26-29.

Aidala, V. J.; "Kalman Filter Behavior in Bearings-Only Tracking Applications", IEEE Transactions on Aerospace and Electronic Systems, vol. AES-15, No. 1 Jan. 1979 pp. 29-39.

Peach, N., "Bearings-only tracking using a set of range-parameterised extended Kalman filters", IEE Proc.—Control Theory Appl. vol. 142, No. 1 Jan. 1995 pp. 73-80.

Arulampalam, M. S., Ristic, B., Gordon, N., Mansell, T., "Bearings-Only Tracking of Manoeuvring Targets Using Particle Filters", EURASIP Journal on Applied Signal Processing 2004:15, 2351-2365, 2004 Hindawi Publishing Corporation.

Arulampalam, M. S., Maskell, S., Gordon, N. and Clapp, T.; "A Tutorial on Particle Filters for Online Nonlinear/Non-Gaussian Bayesian Tracking", IEFF Transactions on Signal Processing, vol. 50, No. 2 Feb. 2002 pp. 174-189.

Brehard, T. and Le Cadre, J.-P.; "Initialization of Particle Filter and Posterior Cramer-Rao Bound for Bearings-Only Tracking in Modified Polar Coordinate System", Institut National De Recherche En Informatique Et En Automatique, INRIA, No. 5074 Jan. 2004 pp. 1-29.

Brehard, T., Le Cade, J.-P., "A New Approach for the Bearings-Only Problem: estimation of the variance-to-range ratio", Int. Conf. on Information Fusion (Fusion'o4), Stockholm, Sweden 2004 pp. 591-598.

Brehard, T. and Le Cadre, J.-P.; "Closed-form Posterior Cramer-Rao Bound for Bearings-Only Tracking", IEEE Trans. on Aerospace and Electronic Systems, vol. 42 No. 2006 pp. 1198-1223.

Brehard, T., and Le Cadre, J.-P.; "Hierarchical Particle Filter for Bearings-Only Tracking", IEEE Transactions on Aerospace and Electronic Systems, vol. 43, No. 4 Oct. 2007 pp. 1567-1586.

Arulampalam, S. and Ristic, B.; "Comparison of the Particle Filter with Range-Parameterised and Modified Polar EKFs for Angle-Only Tracking", In Signal and Sata Processing of Small Targets 2000, Proceedings of SPIE vol. 4048 (2000).

Joarder, K. and Raviv, D., "A Novel method to Calculate Looming Cue for Threat of Collision", IEE 1995 pp. 341-346.

Geyer, C., Dey, D., and Singh, S., "Prototype Sense-and-Avoid System for UAVs", Robotics Institute, Carnegie Mellon University, Tech. Rep. CMU-RI-TR-09-09, 2009 pp. 1-49.

Petridis, S., Geyer, C., and Singh, S., "Learning to Detect Planes at Low Resolutions", in Proceedings of 6th International Conference on Computer Vision Systems (ICVS), vol. 5008, May 2008 pp. 1-19.

Carnie, R. and Walker, R., Image Processing Algorithms for "UAV Sense and Avoid", in Proceedings of the 2006 IEEE International Conference on Robotics and Automation, Orlando, Florida—May 206, pp. 2848-2853.

MC Candless, J. W., "Detection of Aircraft in Video Sequences Using a Predictive Optical Flow Algorithm", Optical Engineering, 3: 523-530, pp. 1-17.

\* cited by examiner

MANEUVERLESS PASSIVE RANGE ESTIMATION USING MONOCULAR IMAGE SEQUENCES

DOMESTIC PRIORITY

This application claims the benefit of earlier filed U.S. Provisional Patent Application No. 61/465,295, filed Mar. 17, 2011, the entire contents of which is incorporated herein by reference.

GOVERNMENT LICENSE RIGHTS

This invention was made with government support under Air Force Contract No. FA8650-07-C-1200. The government has certain rights in the invention.

BACKGROUND

Estimating the range to a mobile object using a monocular camera fixed to a moving platform has, in general, remained an unsolved problem for the past three decades. An effective solution to this problem can be used in autonomous collision detection and avoidance applications for unmanned vehicles, especially unmanned aerial vehicles and surface vehicles. The technology can also be used to provide situational awareness information to manned air and water crafts moving in dynamic environments. In this disclosure, we present a novel approach to compute the range or distance to a dynamic object using a sequence of monocular images captured from a moving sensor platform. In what follows, we shall use the term "intruder" to describe the dynamic object whose range is to be estimated.

Depending on the sensor resolution, imaging sensors can provide very accurate estimates of the relative bearing angle to the intruder. At large distances, an intruder may occupy only a few pixels on an image. The classical approach is to treat the intruder as a point target and use bearing angle measurements to the tracked point. However, this approach is, in general, not sufficient due to the inherent unobservability of the intruder dynamics. We use an example to illustrate this problem.

Figure 1:
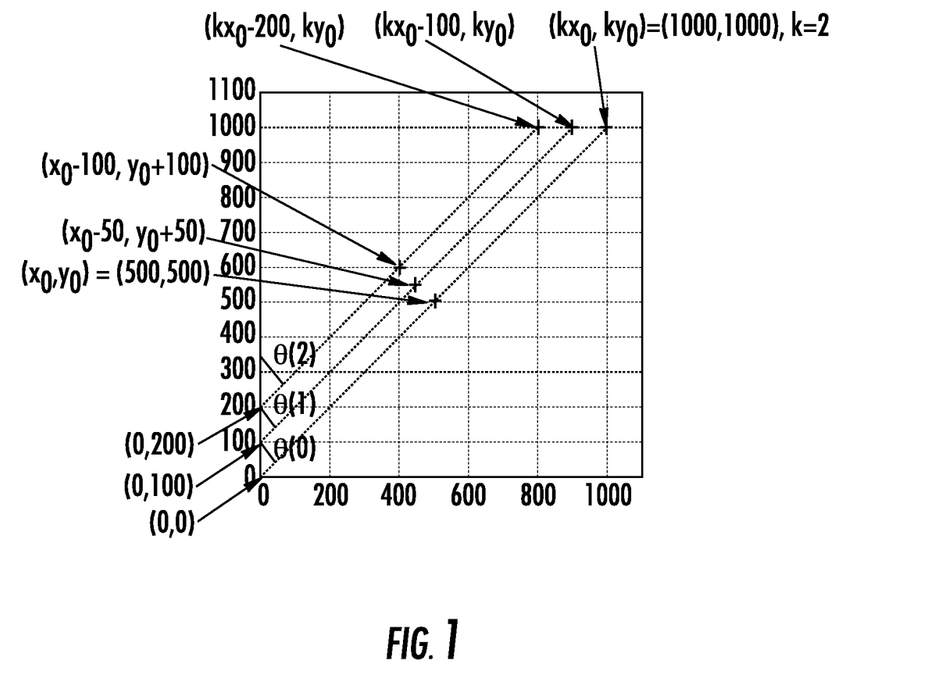
FIG. 1 is a graph showing the inherent observability problem present in bearing-only tracking.

Let us assume that the sensor platform is initially located at (0,0) in a two-dimensional plane and moves along the positive y-axis with velocity given by $v_s$. Let us assume that the intruder initially located at $(x_0, y_0)$ is moving with velocity (u, v) where u and v represent the X and Y components of the velocity. The position of the sensor at any time t is given by $(0, v_s t)$. The position of the intruder at time t is given by $(x_0+ut, y_0+vt)$. The bearing angle to the intruder as measured from the sensor at any given time is, therefore, given by arctan $(y_0+(v-v_s)t)/(x_0+ut)$. Now, let us assume there is another intruder located initially at $(kx_0, ky_0)$ moving with velocity (ku, kv−(k−1)$v_s$), where k is a positive constant and not equal to 1. Now, notice that the relative bearing to the second intruder measured from the sensor at any time t is given by arctan $(ky_0+(kv-(k-1)v_s)t-v_s t)/(kx_0+kut)$ which is equal to arctan $(ky_0+kvt-kv_s t)/(kx_0+kut)$=arctan $(y_0+(V-v_s)t)/(x_0+ut)$. Therefore, two intruders with distinct trajectories (k≠1) generate the same bearing angle measurement at the sensor. This clearly illustrates the inherent observability problem present in bearing-only tracking Please refer to FIG. 1 for a specific example. In this case, $(x_0, y_0)$=(500,500), k=2, $v_s$=100, u=−50 and v=50. The sensor position is shown by red circles. The first intruder's position is represented by blue plus signs. The second intruder (position denoted by black asterisks) is moving with velocity equal to (−50k, 50k−(k−1)100)=(−100, 0). The angles θ(0), θ(1) and θ(2) denote the relative bearing to the two intruders at time instants 0, 1 and 2. Notice that both intruders subtend the same relative bearing angles with respect to the sensor, but k≠1 signifying that the two intruder trajectories are distinct as can be seen in the figure.

The conditions of unobservability in a bearing-only tracking problem have been extensively studied since the late 1970's. This body of research has established that the intruder state is observable, in general, only if the order of sensor dynamics is greater than the intruder dynamics. For an intruder moving with constant velocity, this implies that the sensor dynamics must involve an acceleration component. In the event that the sensor dynamics are not of a higher order, the sensor platform must execute a deliberate maneuver involving a higher order dynamics component to be able to estimate the range. With the growing use of Unmanned Aerial Vehicles (UAVs) in recent years, such a "maneuver-based" approach has been proposed as a solution to the passive camera based Sense and Avoid (SAA) problem: upon detecting an intruder, the UAV maneuvers in order to triangulate and resolve the position of the intruder. However, a maneuver-based approach is undesirable in many ways especially in military operations. It may lead to waste of fuel, loss in mission performance, and is in general bad airmanship.

Other research deals with choosing the right coordinate frames and filters for bearings-only tracking from the point of view of stability and unbiasedness. For example, an Extended Kalman Filter (EKF) applied to bearings-only target tracking has been theoretically analyzed and has established the reasons for the filter bias and instability. A modified polar coordinate system based Kalman Filter has also been proposed to separate the observable and unobservable dynamics. Further, a bank of EKFs each with a different initial range estimate referred to as the range-parameterized (RP) tracker has been proposed and shown to perform better than classical EKF implementations. More recently, particle filter solutions to bearings-only tracking problem are receiving considerable attention and they have been implemented to track both maneuvering and non-maneuvering targets. Particle filter and RP EKF have been compared and it has been shown that the particle filter is only marginally better than the Range Parameterized EKF but is considerably more robust to errors in the initial target range.

This disclosure presents a novel passive image based ranging approach that does not require the sensor platform to maneuver. Analytical results prove that the approach can be used to estimate the range to an intruder without any sensor maneuver under very general conditions. Tests conducted on real flight-test data have demonstrated the practicality of the approach.

The invention in this disclosure concerns a novel method to estimate the range to a moving rigid body from a mobile platform using monocular passive cameras such as electro-optical or infra-red camera mounted on the platform. The primary application of the proposed technology is in the area of collision detection and avoidance for unmanned vehicles. Unmanned aerial, surface and ground vehicles equipped with cameras can use the proposed invention to estimate the range to other moving objects in their vicinity. The range information can then be used to determine the trajectory of the moving objects and maintain a safe distance from them.

Generally, in a computerized system including a camera mounted on a moving vehicle, wherein the camera acquires consecutively in real time a plurality of images of a moving object within a field of view of the camera, a method for determining a range of said moving object from said moving vehicle comprises the steps of:

(a) detecting the moving object (intruder) within each of said plurality of images;

(b) identifying two feature points $p_1$ and $p_2$ on said detected object where $p_1$ and $p_2$ satisfy a certain geometric relationship with the velocity vector of the detected object including but not limited to that the two feature points represent a leading point of the detected object and a trailing point of the detected object; and (c) recursively calculating the range to the object based on changes in the positions of the feature points $p_1$ and $p_2$ in the sequential images and further based on the assumption that the geometric relationship mentioned under item (b), including but not limited to the assumption that the detected object is traveling in a direction along a line connecting feature points $p_1$ and $p_2$, is valid The key aspect of the invention lies in the premise that if you can assume pure translational movement and assume a direction of motion based on the image, then you can recursively calculate the range without the order of sensor dynamics being greater than the intruder dynamics, i.e. without any extraneous maneuvering.

Accordingly, among the objects of the instant invention are: the provision of a maneuverless passive ranging method.

Another object of the invention is the provision of a ranging method which extracts feature points on a detected object and provides a geometric relationship between the spatial positions of the feature points and the direction of velocity of the object.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 2:
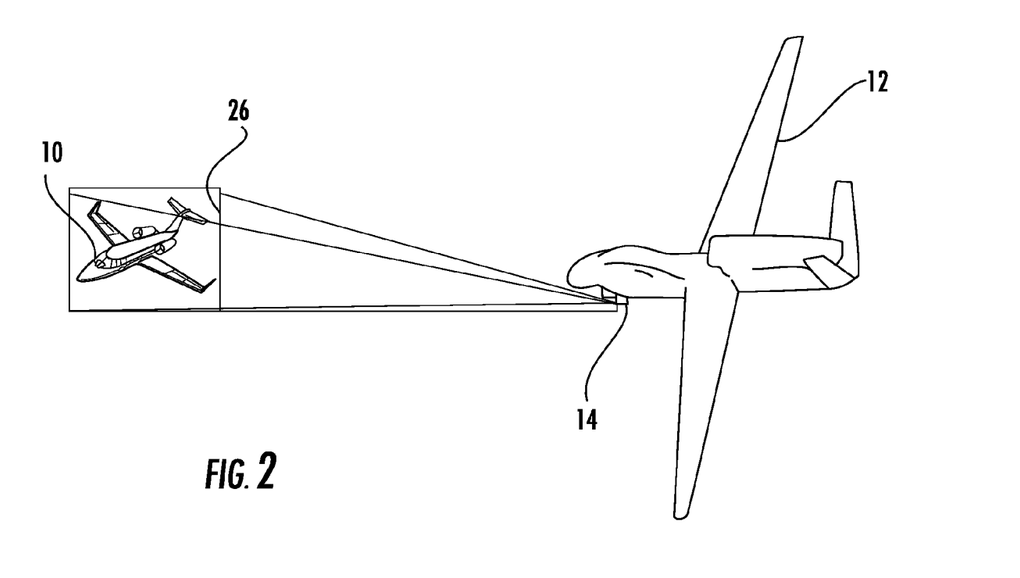
FIG. 2 is an illustration of a moving sensor platform (unmanned aircraft) and a moving object (intruder) within the field of view of the camera mounted on the platform.

Referring to FIGS. 2-5, the invention in this disclosure concerns a novel method to estimate a range to a moving rigid body 10 from a mobile platform 12 using monocular passive cameras 14 such as electro-optical or infra-red camera mounted on the platform 12. The primary application of the proposed technology is in the area of collision detection and avoidance for unmanned vehicles. Unmanned aerial, surface and ground vehicles equipped with cameras can use the proposed invention to estimate the range to other moving objects in their vicinity. As illustrated in FIG. 2, the exemplary embodiment shows an unmanned aerial vehicle (UAV) 12 (moving platform) estimating range to a civilian aircraft 10 (moving rigid body/intruder). The range information can then be used to determine the trajectory of the moving objects and maintain a safe distance from them.

Figure 3:
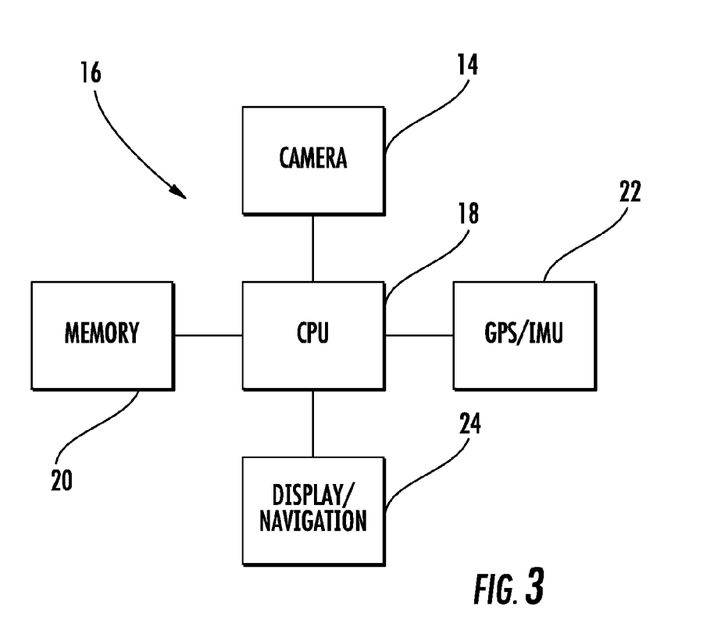
FIG. 3 is a schematic block diagram of a computer system in accordance with the invention.

Generally the invention is implemented in a computerized system 16 including a CPU 18, memory 20 and a camera mounted on the platform 12. The system 16 communicates with the vehicles navigation system and receives inputs from the vehicles global positioning system/inertial measurement unit (GPS/IMU) 22. The estimated range derived from the system 16 can be output back to the navigation system for avoidance measures or output to a display 24.

The invention is described in detail herein. In Section 1, there are described some preliminary notions that are used throughout the document. In Section 2, there are presented some novel mathematical results which form the basis of the invention. In Section 3, the monocular passive ranging (MPR) method is described. In Section 4, there is described a novel image processing algorithm which can be used as a module of the MPR algorithm when the rigid body to which the range is to be estimated is an aircraft. In Section 5, another variant of the MPR method is described.

1. Preliminaries

In this section, we describe concepts and notation to be used throughout this document. For any time t, let the positions of two feature points on the intruder be $(x_1(t), y_1(t), z_1(t))$ and $(x_2(t), y_2(t), z_2(t))$ respectively, where $x_1(t), y_1(t), z_1(t), x_2(t), y_2(t), z_2(t) \in \mathbb{R}$, where $\mathbb{R}$ is the set of real numbers. Here the coordinates are measured with respect to a fixed global frame of reference. Let the position of the sensor be $(x_s(t), y_s(t), z_s(t))$, where again $x_s(t), y_s(t), z_s(t) \in \mathbb{R}$. Let $r_i(t) \in \mathbb{R}^3$ be the position vector of feature point i with respect to the sensor at time t, where $i \in \{1, 2\}$. In other words, we have, $$r_i(t) := [x_i(t) - x_s(t) y_i(t) - y_s(t) z_i(t) - z_s(t)]$$

Given a vector $X \in \mathbb{R}^N$, let $\|X\|$ denote the Euclidean norm of the vector. We let $X(t)^{(n)}$ denote the nth derivative of $X(t)$ with respect to time, assuming that the nth derivative exists. For notational convenience, we also assume that $X(t)^{(0)}$ is equivalent to $X(t)$. We will also use $\|X(t)\|$ as an alternate representation of $\|X(t)\|^{(1)}$. Similarly, we let $\|X(t)\|^{(n)}$ denote the nth derivative of $\|X(t)\|$ with respect to time. In what follows, for simplicity we shall omit the dependence on time wherever it is clear from the context.

2. Novel Mathematical Conditions for Maneuverless Monocular Passive Ranging

In this section, we present the results on the observability of the intruder states. Intuitively speaking, an intruder state is said to be observable if the state can estimated from the available measurements. In particular, we are interested in observing the range to the intruder at a given time.

Lemma 1.

Let the intruder be a rigid body undergoing a pure translational motion. Let $(x_1(t), y_1(t), z_1(t))$ and $(x_2(t), y_2(t), z_2(t))$ be the locations of two points on the intruder at time t. Assuming that the motion is sufficiently smooth for the first order derivatives to exist, we have $\dot{x}_1 = \dot{x}_2$; $\dot{y}_1 = \dot{y}_2$; $\dot{z}_1 = \dot{z}_2$.

The proof is a straightforward consequence of the fact that the body is rigid and undergoes no rotation. We are now ready to state our main results on observability. The results are summarized by the following theorems.

Theorem 1.

Let $(x(t), y(t), z(t))$ represent the trajectory of a given point on a mobile rigid intruder at time t. Likewise, let $(x_s(t), y_s(t), z_s(t))$ represent the trajectory of the sensor. Let $r(t)$ denote the vector $(x(t)-x_s(t), y(t)-y_s(t), z(t)-z_s(t))$. Let the measurement vector be defined by $h(t):=r(t)/\|r(t)\|$ and let $h_x(t)$, $h_y(t)$ and $h_z(t)$ denote the three components of $h(t)$. Let the following conditions be true:

(i) there exists a positive integer $N \geq 2$ such that $r(t)^{(i)}$ exists for all t and for all $i \in \{1, \ldots, 2N-2\}$;
(ii) $r(t)^{(N)}$ is equal to zero.
(iii) $h_x^{(i)}$, $h_y^{(i)}$ and $h_z^{(i)}$ are non zero for all $i \in \{0, \ldots, N-2\}$.

Then the quantity $\|r(t)\|^{(1)}/\|r(t)\|$ is observable if the following conditions are true at time t.

$$\frac{h_x^{(1)}}{h_y^{(1)}} \neq \frac{h_x}{h_y}, \quad (i)$$

and (ii) for $N>2$ there does not exist a set of real numbers $\{\alpha_1, \ldots, \alpha_{N-2}\}$ with at least one of them not equal to zero such that both the following conditions are true:

$$h_x^{(N-1)} = \sum_{i=1}^{N-2} h_x^{(N-1-i)} \alpha_i, \quad (1)$$

$$h_y^{(N-1)} = \sum_{i=1}^{N-2} h_x^{(N-1-i)} \alpha_i. \quad (2)$$

Theorem 2.

Let $(x_1(t), y_1(t), z_1(t))$ and $(x_2(t), y_2(t), z_2(t))$ be the locations of two points on a mobile rigid intruder at time t. Let the rigid body's motion be purely translational. Let $[u_s(t)\ v_s(t)\ w_s(t)]$ and $[u(t)\ v(t)\ w(t)]$ be the velocity vectors of the sensor and the intruder at time t. Let $R \in SO(3)$ be a rotation matrix such that $(1/\|[u(t)\ v(t)\ w(t)]\|)[u(t)\ v(t)\ w(t)]^T = (1/\|[x_1(t)-x_2(t)\ y_1(t)-y_2(t)\ z_1(t)-z_2(t)]\|)R[x_1(t)-x_2(t)\ y_1(t)-y_2(t)\ z_1(t)-z_2(t)]^T$. Let $r_i(t)$ denote the vector $(x_i(t)-x_s(t), y_i(t)-y_s(t), z_i(t)-z_s(t))$ for $i \in \{1,2\}$. Let the measurements be given by $h_i(t):=r_i(t)/\|r_i t\|$ for $i \in \{1,2\}$. Let $h_{i_x}$, $h_{i_y}$ and $h_{i_z}$ denote the x, y and z components of $h_i$. Suppose that the following conditions hold:

(i)

$$\frac{\|r_1\|^{(1)}}{\|r_1\|}$$

is observable;

(ii)

$$\beta_2 \neq 0 \text{ and } \gamma_2 \neq \pi/2, \text{ where } \beta_i = \arctan\frac{h_{i_x}}{h_{i_y}} \text{ and } \gamma_i = \arctan\frac{h_{i_z}}{\sqrt{(h_{i_x}^2 + h_{i_y}^2)}};$$

(iii) The rotation matrix R is known; and
(iv) The velocity of the sensor is non-zero.

Then, the states of the intruder are observable as long as the vectors $[u_s(t)\ v_s(t)\ w_s(t)]$ and $[u(t)\ v(t)\ w(t)]$ are not parallel.

Theorem 3.

Let the intruder be a rigid body undergoing a translation motion. Let $(x_1(t), y_1(t), z_1(t))$ and $(x_2(t), y_2(t), z_2(t))$ be the locations of two feature points on the intruder at time t. Let $[u_s(t)\ v_s(t)\ w_s(t)]$ and $[u(t)\ v(t)\ w(t)]$ be the velocity vector of the sensor and the intruder at time t. Let $\alpha \in [0, \pi/2]$ be the angle between the vectors $[u(t)\ v(t)\ w(t)]$ and $[x_1(t)-x_2(t)\ y_1(t)-y_2(t)\ z_1(t)-z_2(t)]$. For parallel vectors, we assume that $\alpha=0$ and for perpendicular vectors $\alpha=\pi/2$.

Suppose that the following conditions hold:

(i)

$$\frac{\|r_1\|^{(1)}}{\|r_1\|}$$

is observable;

(ii) $\beta_2 \neq 0$, and $y_2 \neq \pi/2$;
(iii) The angle $\alpha$ is known; and
(iv) The velocity of the sensor is non-zero.

Then, the following statements hold true.

(i) If $\alpha=0$ and $(u_s, v_s, w_s)$ is not parallel to the vector $(x_1-x_2, y_1-y_2, z_1-z_2)$, then the intruder states are observable;
(ii) If $\alpha=\pi/2$ and the vector $(u_s, v_s, w_s)$ is not perpendicular to the vector $(x_1-x_2, y_1-y_2, z_1-z_2)$, then the intruder states are observable;

One of the critical assumptions in the above theorem is that $(u_s, v_s, w_s)$ is not parallel or perpendicular to the vector $(x_1-x_2, y_1-y_2, z_1-z_2)$. This again corresponds to events that are highly improbable Now that we have established the mathematical conditions for the range to an intruder to be observable, we present a novel monocular passive ranging method that does not require the sensor platform to maneuver.

3. A novel maneuverless monocular passive ranging (MPR) method

In this section, a novel MPR method based on the applications of Theorem 1 and Theorems 2 and 3 is described. We assume that there is a mobile platform containing a passive monocular camera system as the sensor. The sensor system is used to detect the presence of the other moving objects 10 in the vicinity and estimate the range to the objects. (See FIGS. 4 and 5) A number of algorithms for detection of objects in images have been proposed in the prior art and we assume that a suitable algorithm is available for use with our proposed invention- our invention concerns the estimation of range to a moving object (intruder) once it has been detected. The following steps describe our method assuming that detection has been accomplished and that there is no noise in any of the measurements.

Figure 6:
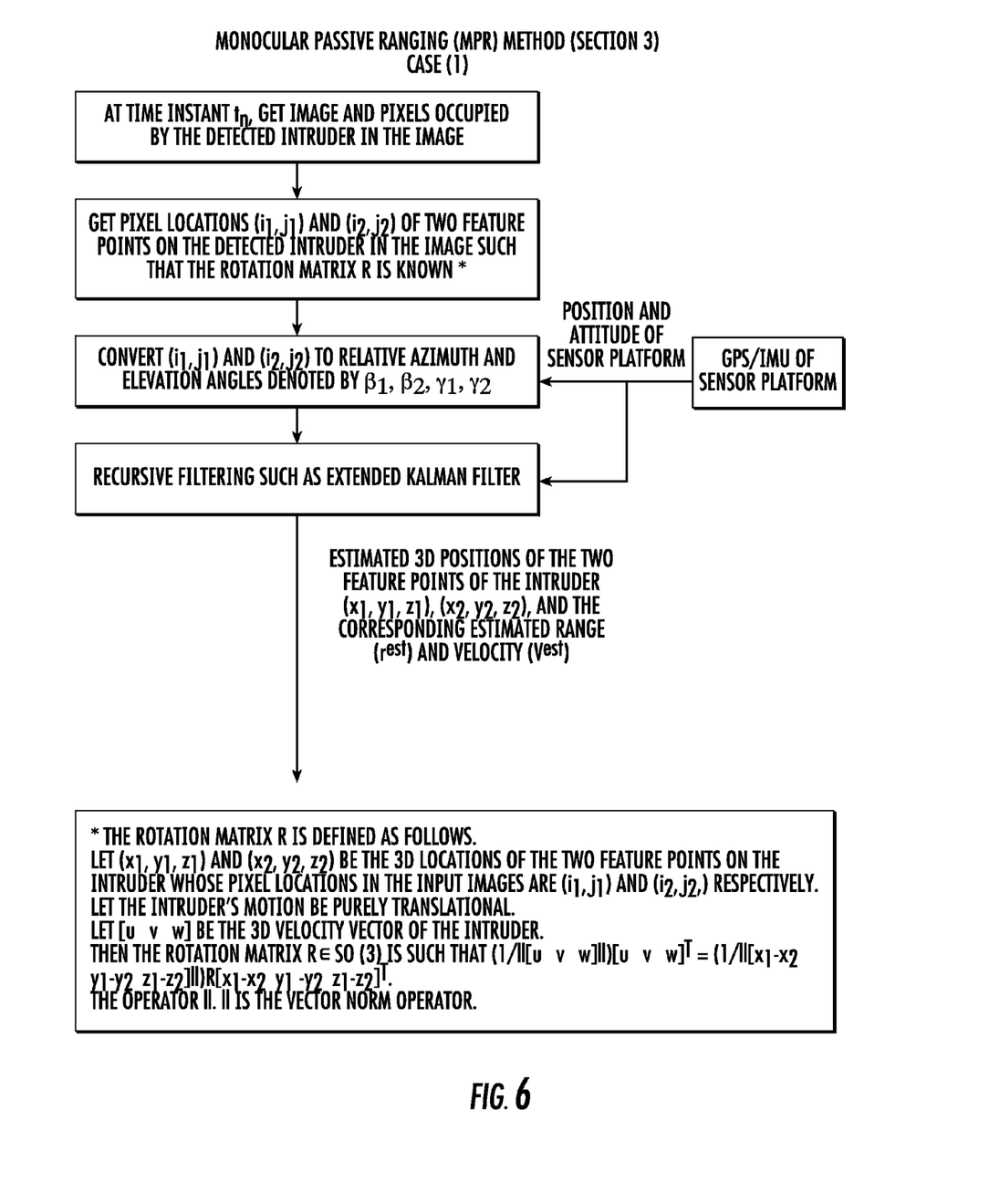
FIG. 6 is a flowchart of an exemplary software implementation of the method of the present invention.
Figure 7:
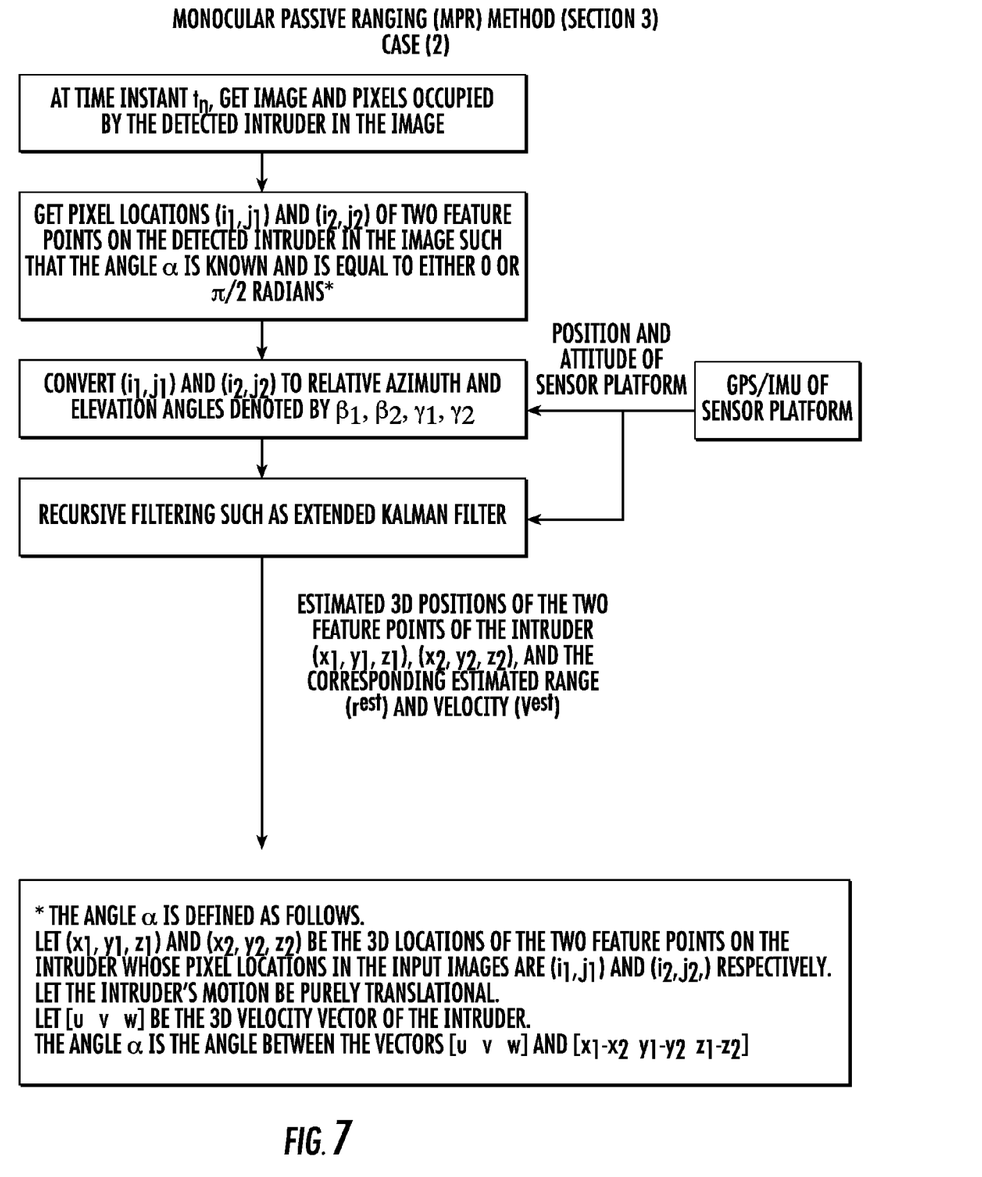
FIG. 7 is a flowchart of another exemplary software implementation of the method of the present invention.

(i) Get the pixel locations $(i_1, j_1)$ and $(i_2, j_2)$ of two feature points in the image of the intruder, denoted for short by $p_1$ and $p_2$, respectively, such that either (1) the rotation matrix R is known or (2) the angle $\alpha$ is known and is equal to either 0 or $\pi/2$ radians The matrix R is defined in Theorem 2 (See FIG. 6 - Case 1). The angle $\alpha$ as defined in Theorem 3 is equal to 0 or $\pi/2$ (See FIG. 7 - Case 2).

(ii) Assume a suitable value of N, where N is a positive integer such that $r_1^{(N)}=0$ is a good approximation of the dynamics of the spatial location of feature point $p_1$ on the intruder.

(iv) Measure the angles $\beta_1$, $\beta_2$, $\gamma_1$ and $\gamma_2$ where the quantities are defined in Theorem 2. This can be accomplished by knowing the intrinsic parameters of the camera (focal length, field of view and the camera mounting angle), the extrinsic parameters of the camera (yaw, pitch and roll angles of the sensor platform obtained from the onboard IMU) and the locations $p_1$ and $p_2$ in the image plane. This is equivalent to the measurement of $h_{x_1}$, $h_{y_1}$, $h_{z_1}$, $h_{x_2}$, $h_{y_2}$, and $h_{z_2}$ where $h_{x_i}$, $h_{y_i}$ and $h_{z_i}$ are the x, y and z components of $r_i/\|r_i\|$.

(v) Estimate the first 2N−3 derivatives of $h_{x_i}$, $h_{y_i}$ and $h_{z_i}$ using the current value of $h_{x_i}$, $h_{y_i}$ and $h_{z_i}$ and their past values stored in the memory 20 Use the constructive proof of Theorem 1 to estimate $\|r_1\|^{(1)}/\|r_1\|$. Notice that N≥2 because N=1 implies that the range is constant.

(vi) Now we know $\|r_1\|^{(1)}/\|r_1\|$ and the first derivatives of $\beta_1$, $\beta_2$, $\gamma_1$ and $\gamma_2$. Depending on whether we know R or whether we know that $\alpha$ is 0 or $\pi/2$ radians, use the method in the proofs of Theorem 2 and Theorem 3 respectively to estimate $\|r_1\|$.

In a practical situation, measurements are always corrupted by noise. In such cases, a recursive filter implementation, such as the Extended Kalman Filter, can be used to estimate the range and other states of the intruder.

For ease of reference of the reader, the equations of dynamics and measurements for a Recursive Filter Implementation for Cases 1 and 2 are laid out below.

Recursive Filter Implementation for Section 3—Case (1)

Dynamics Equations $$x_1^{(N)} - x_s^{(N)} = 0,\ y_1^{(N)} - y_s^{(N)} = 0,\ z_1^{(N)} - z_s^{(N)} = 0$$

$$x_2^{(N)} - x_s^{(N)} = 0,\ y_2^{(N)} - y_s^{(N)} = 0,\ z_2^{(N)} - z_s^{(N)} = 0$$

$$x_1^{(i)} = x_2^{(i)},\ 1 \le i \le N$$

$$y_1^{(i)} = y_2^{(i)},\ 1 \le i \le N$$

$$z_1^{(i)} = z_2^{(i)},\ 1 \le i \le N$$

$$u(R_{21}(x_2 - x_1) + R_{22}(y_2 - y_1) + R_{23}(z_2 - z_1)) =$$
$$v(R_{11}(x_2 - x_1) + R_{12}(y_2 - y_1) + R_{13}(z_2 - z_1))$$

$$u(R_{31}(x_2 - x_1) + R_{32}(y_2 - y_1) + R_{33}(z_2 - z_1)) =$$
$$w(R_{11}(x_2 - x_1) + R_{12}(y_2 - y_1) + R_{13}(z_2 - z_1))$$

Here N is a suitable positive integer, the superscript (N) denotes the Nth derivative with respect to time, $u=x_1^{(1)}$, $v=y_1^{(1)}$, $w=z_1^{(1)}$ and $R_{ij}$ is the ij element of the rotation matrix R, and $(x_s,y_s,z_s)$ is the 3D position of the sensor platform.

Measurement Equations $$\beta_1 = \arctan\frac{h_{1_x}}{h_{1_y}}$$

$$\beta_2 = \arctan\frac{h_{2_x}}{h_{2_y}}$$

$$\gamma_1 = \arctan\frac{h_{1_z}}{\sqrt{(h_{1_x}^2 + h_{1_y}^2)}}$$

$$\gamma_2 = \arctan\frac{h_{2_z}}{\sqrt{(h_{2_x}^2 + h_{2_y}^2)}}$$

where $$h_{1_x} = \frac{x_1 - x_s}{\sqrt{(x_1 - x_s)^2 + (y_1 - y_s)^2 + (z_1 - z_s)^2}}$$

$$h_{1_y} = \frac{y_1 - y_s}{\sqrt{(x_1 - x_s)^2 + (y_1 - y_s)^2 + (z_1 - z_s)^2}}$$

$$h_{1_z} = \frac{z_1 - z_s}{\sqrt{(x_1 - x_s)^2 + (y_1 - y_s)^2 + (z_1 - z_s)^2}}$$

$$h_{2_x} = \frac{x_2 - x_s}{\sqrt{(x_2 - x_s)^2 + (y_2 - y_s)^2 + (z_2 - z_s)^2}}$$

$$h_{2_y} = \frac{y_2 - y_s}{\sqrt{(x_2 - x_s)^2 + (y_2 - y_s)^2 + (z_2 - z_s)^2}}$$

$$h_{2_z} = \frac{z_2 - z_s}{\sqrt{(x_2 - x_s)^2 + (y_2 - y_s)^2 + (z_2 - z_s)^2}}$$

Knowing the dynamics and the measurement equations, standard non-linear filtering techniques such as the Extended Kalman Filter can be implemented to get an estimate of the states $(x_1, y_1, z_1)$, $(x_2, y_2, z_2)$, and $(u, v, w)$. Let the estimates be denoted by $(\hat{x}_1, \hat{y}_1, \hat{z}_1)$, $(\hat{x}_2, \hat{y}_2, \hat{z}_2)$, and $(\hat{u}, \hat{v}, \hat{w})$. Once these states are estimated, the estimated range is given as follows:

$$r^{est} = \sqrt{\left(\frac{\hat{x}_1 + \hat{x}_2}{2} - x_s\right)^2 + \left(\frac{\hat{y}_1 + \hat{y}_2}{2} - y_s\right)^2 + \left(\frac{\hat{z}_1 + \hat{z}_2}{2} - z_s\right)^2}$$

$$V^{est} = \sqrt{\hat{u}^2 + \hat{v}^2 + \hat{w}^2}$$

Recursive Filter Implementation for Section 4.3—Case (2) and for Section 5 (Below)

Dynamics Equations $$x_1^{(N)} - x_s^{(N)} = 0,\ y_1^{(N)} - y_s^{(N)} = 0,\ z_1^{(N)} - z_s^{(N)} = 0$$

$$x_2^{(N)} - x_s^{(N)} = 0,\ y_2^{(N)} - y_s^{(N)} = 0,\ z_2^{(N)} - z_s^{(N)} = 0$$

$$x_1^{(i)} = x_2^{(i)},\ 1 \le i \le N$$

$$y_1^{(i)} = y_2^{(i)},\ 1 \le i \le N$$

$$z_1^{(i)} = z_2^{(i)},\ 1 \le i \le N$$

If $\alpha=0$ radians, then:

$$v(x_2-x_1)=u(y_2-y_1)$$

$$w(y_2-y_1)=v(z_2-z_1)$$

If $\alpha=\pi/2$ radians, then:

$$u(x_2-x_1)+v(y_2-y_1)+w(z_2-z_1)=0.$$

Here N is a suitable positive integer, the superscript (N) denotes the Nth derivative with respect to time, $u=x_1^{(1)}$, $v=y_1^{(1)}$, $w=z_1^{(1)}$ and $(x_s,y_s,z_s)$ is the 3D position of the sensor platform.

Measurement Equations $$\beta_1 = \arctan\frac{h_{1_x}}{h_{1_y}}$$

$$\beta_2 = \arctan\frac{h_{2_x}}{h_{2_y}}$$

-continued $$\gamma_1 = \arctan\frac{h_{1_z}}{\sqrt{(h_{1_x}^2 + h_{1_y}^2)}}$$

$$\gamma_2 = \arctan\frac{h_{2_z}}{\sqrt{(h_{2_x}^2 + h_{2_y}^2)}}$$

where $$h_{1_x} = \frac{x_1 - x_s}{\sqrt{(x_1 - x_s)^2 + (y_1 - y_s)^2 + (z_1 - z_s)^2}}$$

$$h_{1_y} = \frac{y_1 - y_s}{\sqrt{(x_1 - x_s)^2 + (y_1 - y_s)^2 + (z_1 - z_s)^2}}$$

$$h_{1_z} = \frac{z_1 - z_s}{\sqrt{(x_1 - x_s)^2 + (y_1 - y_s)^2 + (z_1 - z_s)^2}}$$

$$h_{2_x} = \frac{x_2 - x_s}{\sqrt{(x_2 - x_s)^2 + (y_2 - y_s)^2 + (z_2 - z_s)^2}}$$

$$h_{2_y} = \frac{y_2 - y_s}{\sqrt{(x_2 - x_s)^2 + (y_2 - y_s)^2 + (z_2 - z_s)^2}}$$

$$h_{2_z} = \frac{z_2 - z_s}{\sqrt{(x_2 - x_s)^2 + (y_2 - y_s)^2 + (z_2 - z_s)^2}}$$

Knowing the dynamics and the measurement equations, standard non-linear filtering techniques such as the Extended Kalman Filter can be implemented to get an estimate of the states $(x_1, y_1, z_1)$, $(x_2, y_2, z_2)$, and $(u, v, w)$. Let the estimates be denoted by $(\hat{x}_1, \hat{y}_1, \hat{z}_1)$, $(\hat{x}_2, \hat{y}_2, \hat{z}_2)$, and $(\hat{u}, \hat{v}, \hat{w})$. Once these states are estimated, the estimated range is given as follows. If $\alpha = 0$ radians, then:

$$r_{\alpha=0}^{est} = \sqrt{\left(\frac{\hat{x}_1 + \hat{x}_2}{2} - x_s\right)^2 + \left(\frac{\hat{y}_1 + \hat{y}_2}{2} - y_s\right)^2 + \left(\frac{\hat{z}_1 + \hat{z}_2}{2} - z_s\right)^2}$$

$$V_{\alpha=0}^{est} = \sqrt{\hat{u}^2 + \hat{v}^2 + \hat{w}^2}$$

If $\alpha = \pi/2$ radians, then:

$$r_{\alpha=\pi/2}^{est} = \sqrt{\left(\frac{\hat{x}_1 + \hat{x}_2}{2} - x_s\right)^2 + \left(\frac{\hat{y}_1 + \hat{y}_2}{2} - y_s\right)^2 + \left(\frac{\hat{z}_1 + \hat{z}_2}{2} - z_s\right)^2}$$

$$V_{\alpha=\pi/2}^{est} = \sqrt{\hat{u}^2 + \hat{v}^2 + \hat{w}^2}$$

4. Image Processing for Feature Point Identification in Aircraft Images

Figure 8:
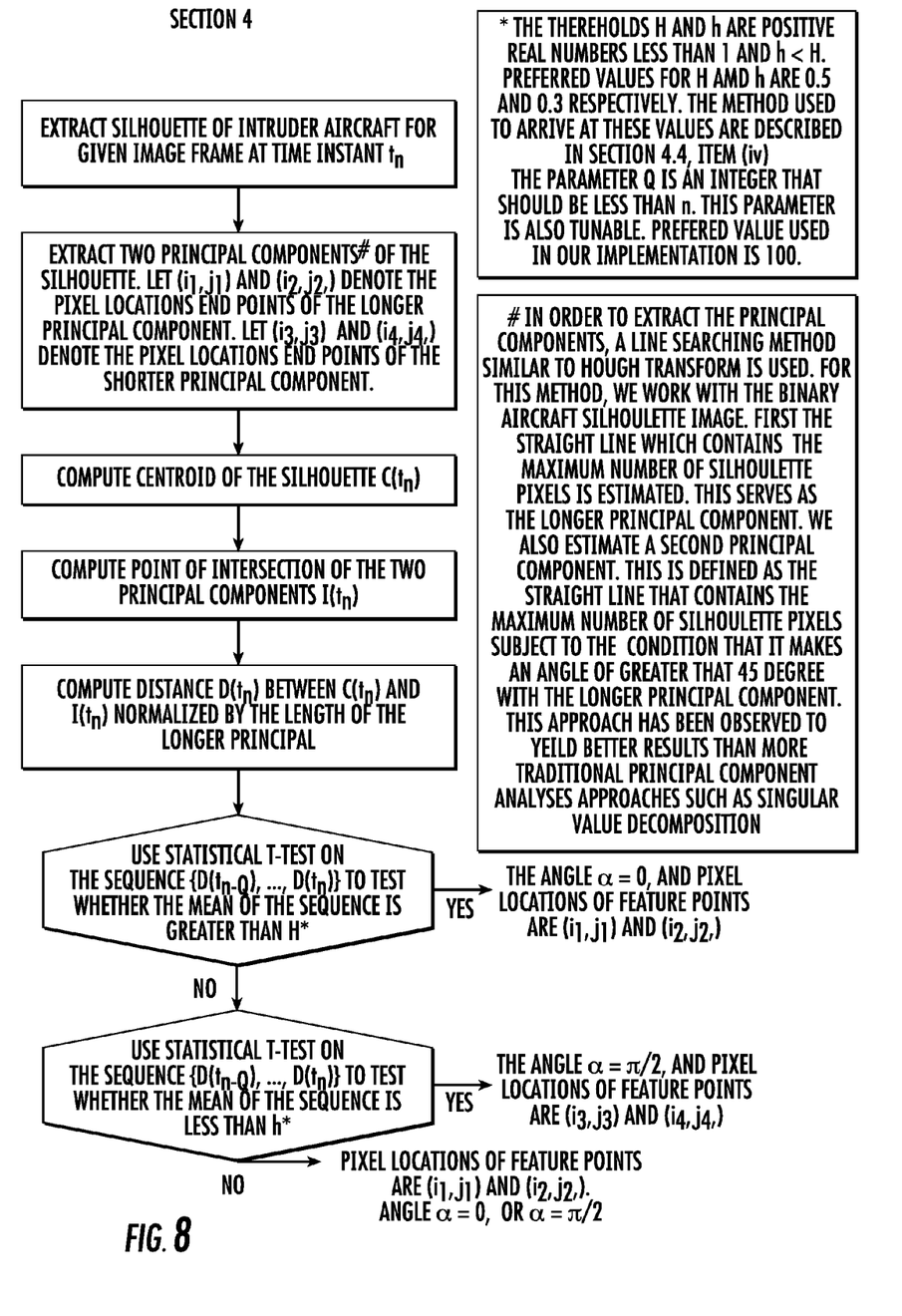
FIG. 8 is a flowchart of a software implementation of a method of extracting a silhouette of the image and identifying the pixel locations $i_1, j_1$ and $i_2, j_2$ of feature points $p_1, p_2$.

In the previous section, there is described a monocular passive ranging method. In step (i) of the method, two feature points on the intruder are identified such that the the rotation matrix R is known or that the angle $\alpha$ is known and is equal to either 0 or $\pi/2$ radians. In this section, a novel method to identify two feature points such that the angle $\alpha$ is equal to either 0 or $\pi/2$ radians is described. The method also provides an algorithm to check if the angle $\alpha$ is equal to 0 or $\pi/2$ radians. This method is applicable to the case when the intruder is an aircraft. A software implementation is laid out in FIG. 8. The basic steps involved are as follows.

Figure 4:
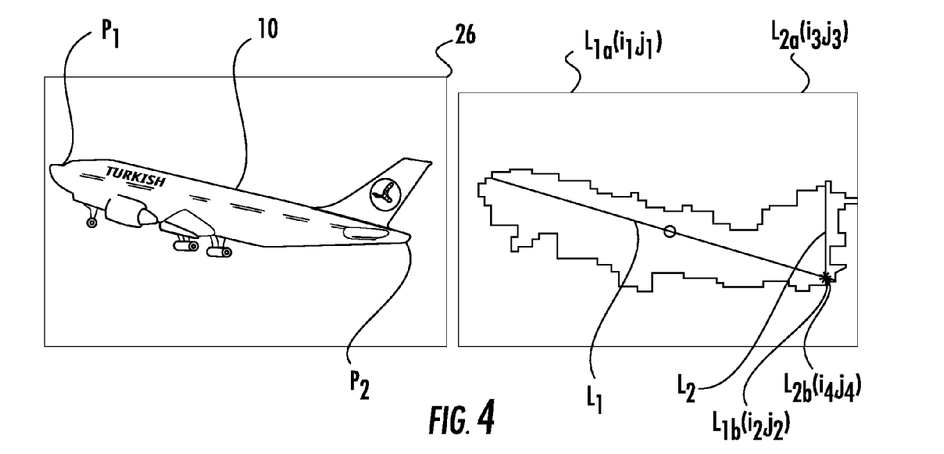
FIG. 4 is an illustration of an image acquired by the camera and an associated silhouette extracted from the image (nose to tail orientation)
Figure 5:
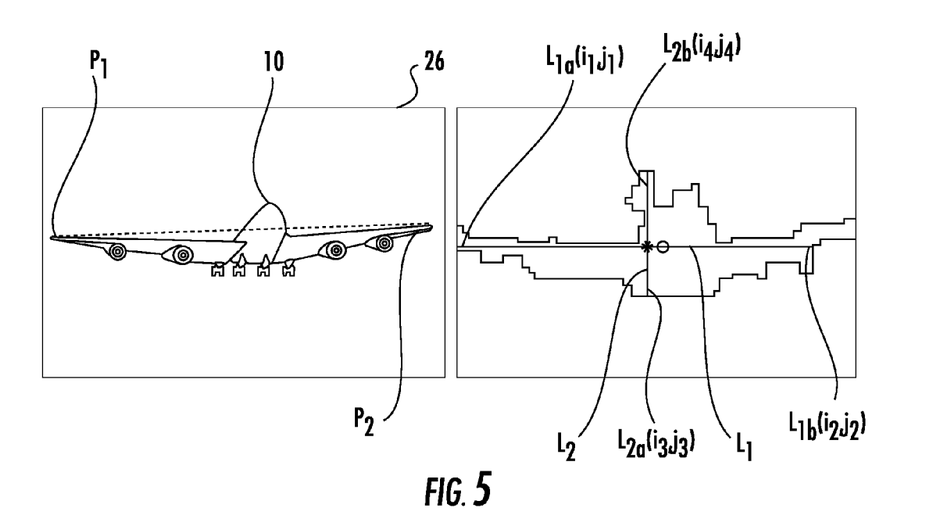
FIG. 5 is another illustration of an image acquired by the camera and an associated silhouette extracted from the image (wingtip to wingtip orientation)

(i) Extraction of the intruder aircraft silhouette. FIGS. 4 and 5 demonstrate the silhouettes extracted by our algorithm on two sample images of commercial airliners downloaded from the internet. The left images show the original images whereas the right images show the respective silhouettes.

(ii) Extraction of the two principal components of the silhouette. In order to extract the principal components, a line searching method similar to Hough transform is used. For this method, the binary aircraft silhouette image is used. First the straight line $L_1$ which contains the maximum number of silhouette pixels is estimated. This serves as the longer principal component. We also estimate a second principal component. This is defined as the straight line $L_2$ that contains the maximum number of silhouette pixels subject to the condition that it makes an angle of greater than 45 degree with the longer principal component. This approach has been observed to yield better results than more traditional principal component analyses approaches such as Singular Value Decomposition.

In FIGS. 4 and 5 (right image), the two principal components are indicated by the lines $L_1$ and $L_2$ on the silhouette. The end points $L_{1a}, L_{1b}$ of the longer primary principal component correspond to either the end points of the fuselage (nose and tail) or to the wing tips. For example, in FIG. 4 (top right), the end points of the longer principal component line correspond to the head and the tail of the aircraft, whereas the end points $L_{1a}, L_{1b}$ of the longer principal component in FIG. 5 correspond to the two wing tips of the aircraft.

(iii) Computation of the normalized distance between the point of intersection of the two principal components and the centroid of the silhouette. For example, in FIG. 4, the point of intersection of the two principal components is indicated by an asterisk, and the centroid of the silhouette is indicated by a circle. The normalized distance is defined as the distance between the asterisk and the circle normalized by the length of the longer principal component which in this case is the length of line $L_1$ in the silhouette. The normalized distance can be used to check whether the end points correspond to the end points of the fuselage or to the wing tips or neither. The intuition is that if the end points are on the fuselage then the normalized distance should be larger than if the end points are the wing tips.

(iv) Creation of a training data set from images for which the identity of the end points of the longer principal component is known. For this data set, the normalized distances are computed. We downloaded 50 aircraft images from the internet—25 corresponding to the case where the end points are on the fuselage and the remaining 25 corresponding to the case where the end points are the wing tips. The normalized distances are extracted for each of the images in the training data set. It is observed that these distances can be clustered into two intervals, [0,0.3] and [0.5,1]. The former and the latter intervals correspond to the wing tips and the fuselage images respectively. This is in accordance with our intuition.

(v) Comparison of the extracted normalized distances in the test images with the normalized distances in the training data. For robust classification, instead of using a single test image we use a sequence of consecutive images, compute the normalized distances for each of the images, and then perform statistical T-tests to test the hypotheses of whether the mean of the normalized distances in the sequence of the test images is greater than 0.5 or less than 0.3. If the hypothesis that the mean is greater than 0.5 is true, then this implies that for the images in the sequence the end points correspond to the fuselage or equivalently that $\alpha$ is equal to zero radians. If the other hypothesis is true then it implies that the end points correspond to the wing tips or that $\alpha$ is equal to $\pi/2$ radians.

5. Likelihood Testing Based Range Estimation

Figure 9:
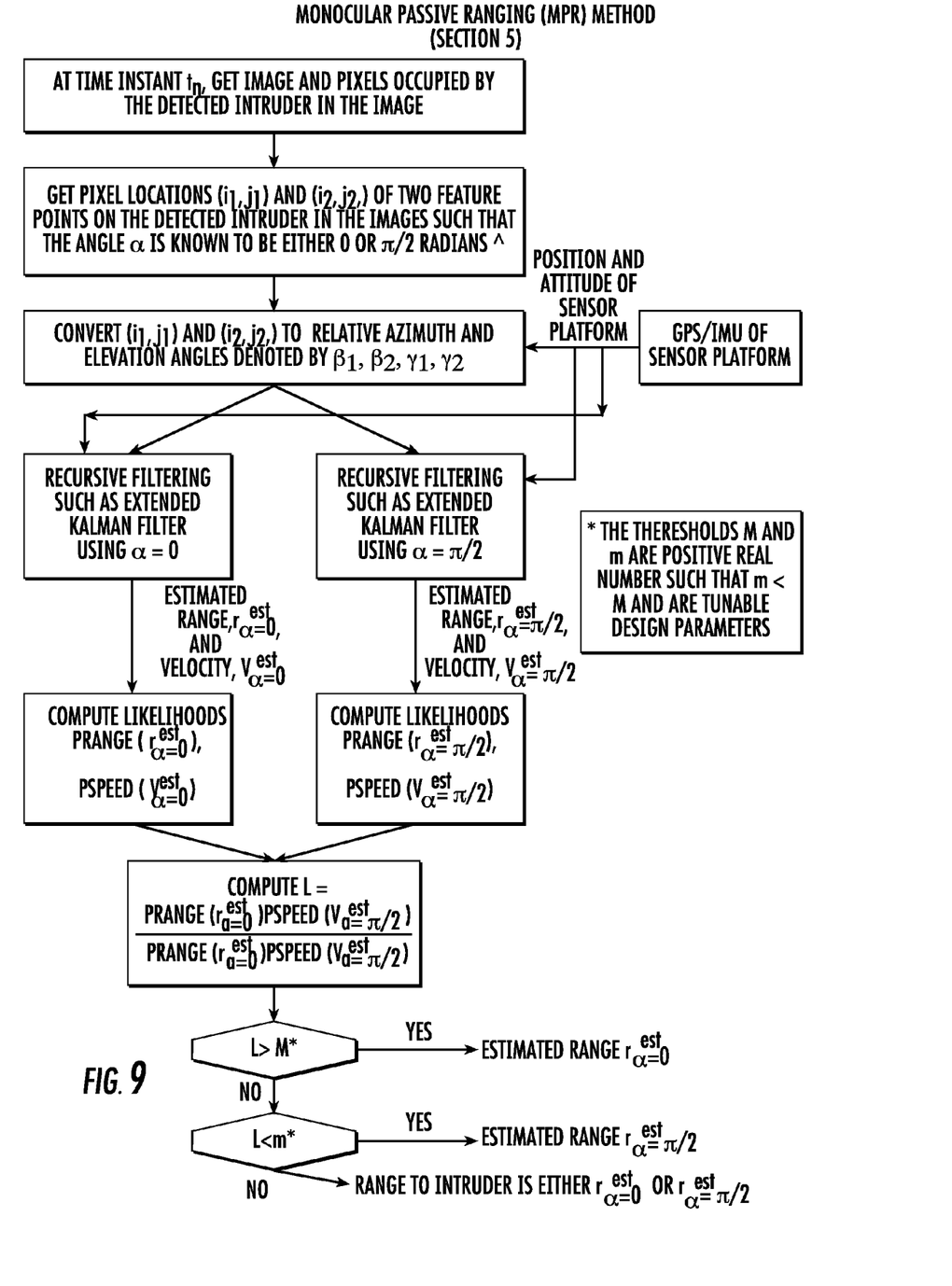
FIG. 9 is a flowchart of a software implementation of another method of the present invention.

In this section, another method for estimating the range to the intruder is described. The difference of this method from the method in Section 3 Case 2 (See FIG. 6—Case 2) is that we only need to know that the angle α is either 0 or π/2 radians but it is not required to know which one of the two it is. A software implementation is laid out in FIG. 9. The sensor system is used to detect the presence of the other moving objects 10 in the vicinity and estimate the range to the objects. (See FIGS. 4 and 5) A number of algorithms for detection of objects in images have been proposed in the prior art and we assume that a suitable algorithm is available for use with our proposed invention—our invention concerns the estimation of range to a moving object (intruder) once it has been detected. The following steps describe our method assuming that detection has been accomplished and that there is no noise in any of the measurements.

(i) Get the pixel locations $(i_1, j_1)$ and $(i_2, j_2)$ of two feature points in the image of the intruder, denoted for short by $p_1$ and $p_2$, respectively, such that the angle α is equal to either 0 or π/2 radians but it is not known which one of the two it is. If the intruder is an aircraft, steps (i) and (ii) of the method in Section 4 can be used to find the end points of the longer principal component of the silhouette of the intruder in the image. These end points serve as points $p_1$ and $p_2$.

(ii) Assuming the angle α is equal to zero, estimate the range to the intruder by application of the method described in Section 3. Once the range to the intruder is estimated, other states such as the range rate can also be estimated since $\|r(t)\|^{(1)}/\|r(t)\|$ is observable according to Theorem 1. Using the knowledge of the bearing angles, and bearing angle derivatives, estimate the velocity of the intruder. Let the estimated range and magnitude of the velocity of the intruder be denoted by $r_{\alpha=0}^{est}$ and $V_{\alpha=0}^{est}$.

(iii) Assuming the angle α is equal to π/2, estimate the range and range rate of the intruder. Using the knowledge of the bearing angles, and bearing angle derivatives, estimate the velocity of the intruder. Let the estimated range and magnitude of the velocity of the intruder be denoted by $r_{\alpha=\pi/2}^{est}$ and $V_{\alpha=\pi/2}^{est}$.

(iv) Let $p_{range}(r_{\alpha=0}^{est})$ be the likelihood of the range estimate being equal to $r_{\alpha=0}^{est}$ based on prior sensor detection ranges. For example, if $r_{\alpha=0}^{est}$ is equal to 10 nautical miles and the sensor detection range can never be more than 5 nautical miles, then the likelihood $p_{range}(r_{\alpha=0}^{est})$ should be small. Likewise, if $r_{\alpha=0}^{est}$ is a small value then too the likelihood $p_{range}(r_{\alpha=0}^{est})$ should be small because then the intruder should have been detected earlier. Likewise, let $p_{range}(r_{\alpha=\pi/2}^{est})$ be the likelihood of the range estimate being equal to $r_{\alpha=\pi/2}^{est}$. Similarly, one can estimate likelihoods $p_{speed}(V_{\alpha=0}^{est})$ and speed $(V_{\alpha=\pi/2}^{est})$ based on typical speeds of the intruders in the domain of operation.

(v) If $$\frac{p_{range}(r_{\alpha=0}^{est}) p_{speed}(V_{\alpha=0}^{est})}{p_{range}(r_{\alpha=\pi/2}^{est}) p_{speed}(V_{\alpha=\pi/2}^{est})}$$

is greater than a certain threshold M then α is equal to 0 and the correct range estimate is $r_{\alpha=0}^{est}$.

If, on the other hand, $$\frac{p_{range}(r_{\alpha=0}^{est}) p_{speed}(V_{\alpha=0}^{est})}{p_{range}(r_{\alpha=\pi/2}^{est}) p_{speed}(V_{\alpha=\pi/2}^{est})}$$

is less than a certain threshold m then α is equal to π/2 and the correct range estimate is $r_{\alpha=\pi/2}^{est}$.

The previous method requires the knowledge of the likelihood functions. Any suitable likelihood function can be used as long as it satisfied two properties. First, it should be a positive real valued function. Second, the function must assume a strictly greater value for an argument that is more likely to occur than another argument that is less likely to occur. The particular choice of the likelihood function depends on the needs of the user and domain of operation. For example, for use in an unmanned aircraft collision avoidance application, the likelihood functions should be designed after a careful study of the types of intruder aircraft operating in the airspace and their performance capabilities as well as the type of passive sensor being used. Likewise, the thresholds M and m are tunable design parameters and should be chosen based on the application scenario and system objectives.

It can therefore be seen that the present invention provides a maneuverless passive ranging method which is based on extracting feature points on a detected object and assuming a direction of movement based on those selected feature points. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a computerized system including a camera mounted on a moving vehicle, a maneuverless, passive method for determining a range of a foreign moving object from said moving vehicle, wherein said foreign moving object is not part of said computerized system, the method comprising the steps of:
   acquiring with said camera, consecutively in real time, a plurality of images of said foreign moving object wherein no positional data is received from said foreign moving object;
   detecting said foreign moving object within each of said plurality of images;
   identifying two feature points $p_1$ and $p_2$ on said detected object within each of said plurality images, where $p_1$ and $p_2$ are utilized to determine a direction of travel of said detected object and where $p_1$ and $p_2$ satisfy a predetermined geometric relationship with a velocity vector of said detected object; and
   recursively calculating the range of said detected object based on changes in the positions of the feature points $p_1$ and $p_2$ in the sequential images and further based on said predetermined geometric relationship without any positional data being received from said detected object and without any assumptions of position or movement of the detected object based on background references.

2. The method of claim 1 wherein said predetermined geometric relationship comprises an assumption that the detected object is traveling in a direction along a line connecting feature points $p_1$ and $p_2$.

3. The method of claim 2 wherein said predetermined geometric relationship further comprises an assumption that the two feature points represent a leading point of the detected object and a trailing point of the detected object.

4. The method of claim 2 wherein said step of identifying said feature points $p_1$ and $p_2$ comprises the step of determining pixel locations $(i_1, j_1)$ and $(i_2, j_2)$ of said feature points $p_1$ and $p_2$ within said image, and said step of recursively calculating said range includes converting said pixel locations to relative azimuth and elevation angles denoted by $\beta_1, \beta_2, \gamma_1, \gamma_2$.

5. The method of claim 1 wherein said predetermined geometric relationship comprises an assumption that the two feature points represent a leading point of the detected object and a trailing point of the detected object.

6. The method of claim 5 wherein said step of identifying said feature points $p_1$ and $p_2$ comprises the step of determining pixel locations $(i_1,j_1)$ and $(i_2,j_2)$ of said feature points $p_1$ and $p_2$ within said image, and said step of recursively calculating said range includes converting said pixel locations to relative azimuth and elevation angles denoted by $\beta_1, \beta_2, \gamma_1, \gamma_2$.

7. The method of claim 1 wherein said step of identifying said feature points $p_1$ and $p_2$ comprises the step of determining pixel locations $(i_1,j_1)$ and $(i_2,j_2)$ of said feature points $p_1$ and $p_2$ within said image, and said step of recursively calculating said range includes converting said pixel locations to relative azimuth and elevation angles denoted by $\beta_1, \beta_2, \gamma_1, \gamma_2$.

8. In a computerized system including a camera mounted on a moving vehicle, wherein the camera acquires consecutively in real time a plurality of images of a moving object within a field of view of the camera, a method for determining a range of said moving object from said moving vehicle, the method comprising the steps of:
detecting said moving object within each of said plurality of images;
identifying two feature points $p_1$ and $p_2$ on said detected object where $p_1$ and $p_2$ satisfy a predetermined geometric relationship with a velocity vector of said detected object, said step of identifying said feature points $p_1$ and $p_2$ further comprising the step of determining pixel locations $(i_1,j_1)$ and $(i_2,j_2)$ of said feature points $p_1$ and $p_2$ within said image; and
recursively calculating the range of said object based on changes in the positions of the feature points $p_1$ and $p_2$ in the sequential images and further based on said predetermined geometric relationship, said step of recursively calculating said range further comprising the step of converting said pixel locations to relative azimuth and elevation angles denoted by $\beta_1, \beta_2, \gamma_1, \gamma_2$, and
wherein the step of recursively calculating said range comprises recursively calculating said range where a rotation matrix R is known and the following conditions are defined:
$(x_1, y_1, z_1)$ and $(x_2, y_2, z_2)$ represent 3D locations of said feature points $(i_1,j_1)$ and $(i_2,j_2)$;
[u, v, w] represents a 3D velocity vector of the object; and rotation matrix $R \in S0(3)$ is such that $(1/\|[u\ v\ w]\|)[u\ v\ w]^T = (1/\|[x_1-x_2\ y_1-y_2\ z_1-z_2]\|)R[x_1-x_2\ y_1-y_2\ z_1-z_2]^T$.

9. In a computerized system including a camera mounted on a moving vehicle, wherein the camera acquires consecutively in real time a plurality of images of a moving object within a field of view of the camera, a method for determining a range of said moving object from said moving vehicle, the method comprising the steps of:
detecting said moving object within each of said plurality of images;
identifying two feature points $p_1$ and $p_2$ on said detected object where $p_1$ and $p_2$ satisfy a predetermined geometric relationship with a velocity vector of said detected object, said step of identifying said feature points $p_1$ and $p_2$ further comprising the step of determining pixel locations $(i_1,j_1)$ and $(i_2,j_2)$ of said feature points $p_1$ and $p_2$ within said image; and
recursively calculating the range of said object based on changes in the positions of the feature points $p_1$ and $p_2$ in the sequential images and further based on said predetermined geometric relationship, said step of recursively calculating said range further comprising the step of converting said pixel locations to relative azimuth and elevation angles denoted by $\beta_1, \beta_2, \gamma_1, \gamma_2$, and
wherein the step of recursively calculating said range comprises recursively calculating said range where an angle $\alpha$ is known and is equal to either 0 or $\pi/2$ radians, and the following conditions are defined:
$(x_1, y_1, z_1)$ and $(x_2, y_2, z_2)$ represent 3D locations of said feature points $(i_1,j_1)$ and $(i_2,j_2)$;
[u, v, w] represents a 3D velocity vector of the object; and angle $\alpha$ is the angle between the vectors [u v w] and $[x_1-x_2\ y_1-y_2\ z_1-z_2]$.

10. In the method of claim 9, said step of determining pixel locations $(i_1,j_1)$ and $(i_2,j_2)$ comprising the steps of:
extracting a silhouette of said object comprising a plurality of pixels associated with said detected object;
extracting a first principal component of said silhouette comprising a first, longer straight line containing a maximum number of said pixels associated with said detected object where $(i_1,j_1)$ and $(i_2,j_2)$ comprise pixel location end points of said first principal component;
extracting a second principal component of said silhouette comprising a second, shorter straight line containing a maximum number of said pixels associated with said detected object where said second straight line makes an angle of greater than 45 degrees with said first straight line, and where $(i_3,j_3)$ and $(i_4,j_4)$ comprise pixel location end points of said shorter principal component;
computing a centroid of said silhouette $C(t_n)$;
computing a point of intersection $I(t_n)$ of said first principal components and said second principal component;
computing a distance $D(t_n)$ between $C(t_n)$ and $I(t_n)$ normalized by a length of said first principal component;
using a statistical T-test on a sequence $\{D(t_{n-Q}),\ldots,D(t_n)\}$ to test whether a mean of the normalized distances is greater than 0.5 or less than 0.3,
wherein if the mean is greater than 0.5 then the angle $\alpha=0$ and the pixel locations of the feature point are $(i_1,j_1)$ and $(i_2,j_2)$, and
further wherein if the mean is less than 0.3 then the angle $\alpha=\pi/2$ and the pixel location of the feature point are $(i_3,j_3)$ and $(i_4,j_4)$.

11. In the method of claim 9, said step of recursively calculating said range comprises the steps of:
recursively calculating said range wherein said angle $\alpha=0$ to obtain an estimated range $r_{\alpha=0}^{est}$ and an estimated velocity $V_{\alpha=0}^{est}$ and computing likelihoods $p_{range}(r_{\alpha=0}^{est})$ and $p_{speed}(V_{\alpha=0}^{est})$;
recursively calculating said range where said angle $\alpha=\pi/2$ to obtain an estimated range $r_{\alpha=\pi/2}^{est}$ and an estimated velocity $V_{\alpha=\pi/2}^{est}$ and computing likelihoods $p_{range}(r_{\alpha=\pi/2}^{est})$ and $p_{speed}(V_{\alpha=\pi/2}^{est})$; and
computing $$L = \frac{p_{range}(r_{\alpha=0}^{est})p_{speed}(V_{\alpha=0}^{est})}{p_{range}(r_{\alpha=\pi/2}^{est})p_{speed}(V_{\alpha=\pi/2}^{est})}$$

where if L is greater than a threshold M then angle $\alpha=0$ and the correct range is $r_{\alpha=0}^{est}$ and where if L is less than a threshold m then angle $\alpha=\pi/2$ and the correct range is $r_{\alpha=\pi/2}^{est}$.

12. The method of claim 11 wherein M and m comprise positive real numbers such that m<M and M and wherein M and m are tunable design parameters.

13. In a computerized system including a camera mounted on a moving vehicle, wherein the camera acquires consecutively in real time a plurality of images of a moving object within a field of view of the camera, a method for determining a range of said moving object from said moving vehicle, the method comprising the steps of:
  detecting said moving object within each of said plurality of images;
  identifying two feature points $p_1$ and $p_2$ on said detected object where $p_1$ and $p_2$ satisfy a predetermined geometric relationship with a velocity vector of said detected object, said predetermined geometric relationship comprising an assumption that the detected object is traveling in a direction along a line connecting feature points $p_1$ and $p_2$, said step of identifying said feature points $p_1$ and $p_2$ further comprising the step of determining pixel locations $(i_1,j_1)$ and $(i_2,j_2)$ of said feature points $p_1$ and $p_2$ within said image; and
  recursively calculating the range of said object based on changes in the positions of the feature points $p_1$ and $p_2$ in the sequential images and further based on said predetermined geometric relationship, said step of recursively calculating said range further comprising the step of converting said pixel locations to relative azimuth and elevation angles denoted by $\beta_1$, $\beta_2$, $\gamma_1$, $\gamma_2$, and
  wherein the step of recursively calculating said range comprises recursively calculating said range where a rotation matrix R is known and the following conditions are defined:
  $(x_1, y_1, z_1)$ and $(x_2, y_2, z_2)$ represent 3D locations of said feature points $(i_1,j_1)$ and $(i_2,j_2)$;
  [u, v, w] represents a 3D velocity vector of the object; and rotation matrix R∈SO(3) is such that $(1/\|[u\ v\ w]\|)[u\ v\ w]^T = (1/\|[x_1-x_2\ y_1-y_2\ z_1-z_2]\|)R[x_1-x_2\ y_1-y_2\ z_1-z_2]^T$.

14. In a computerized system including a camera mounted on a moving vehicle, wherein the camera acquires consecutively in real time a plurality of images of a moving object within a field of view of the camera, a method for determining a range of said moving object from said moving vehicle, the method comprising the steps of:
  detecting said moving object within each of said plurality of images;
  identifying two feature points $p_1$ and $p_2$ on said detected object where $p_1$ and $p_2$ satisfy a predetermined geometric relationship with a velocity vector of said detected object, said predetermined geometric relationship comprising an assumption that the detected object is traveling in a direction along a line connecting feature points $p_1$ and $p_2$, said step of identifying said feature points $p_1$ and $p_2$ further comprising the step of determining pixel locations $(i_1,j_1)$ and $(i_2,j_2)$ of said feature points $p_1$ and $p_2$ within said image; and
  recursively calculating the range of said object based on changes in the positions of the feature points $p_1$ and $p_2$ in the sequential images and further based on said predetermined geometric relationship, said step of recursively calculating said range further comprising the step of converting said pixel locations to relative azimuth and elevation angles denoted by $\beta_1$, $\beta_2$, $\gamma_1$, $\gamma_2$, and
  wherein the step of recursively calculating said range comprises recursively calculating said range where an angle α is known and is equal to either 0 or π/2 radians, and the following conditions are defined:
  $(x_1, y_1, z_1)$ and $(x_2, y_2, z_2)$ represent 3D locations of said feature points $(i_1,j_1)$ and $(i_2,j_2)$;
  [u, v, w] represents a 3D velocity vector of the object; and angle α is the angle between the vectors [u v w] and $[x_1-x_2\ y_1-y_2\ z_1-z_2]$.

15. In the method of claim 13, said step of determining pixel locations $(i_1,j_1)$ and $(i_2,j_2)$ comprising the steps of:
  extracting a silhouette of said object comprising a plurality of pixels associated with said detected object;
  extracting a first principal component of said silhouette comprising a first, longer straight line containing a maximum number of said pixels associated with said detected object where $(i_1,j_1)$ and $(i_2,j_2)$ comprise pixel location end points of said first principal component;
  extracting a second principal component of said silhouette comprising a second, shorter straight line containing a maximum number of said pixels associated with said detected object where said second straight line makes an angle of greater than 45 degrees with said first straight line, and where $(i_3,j_3)$ and $(i_4,j_4)$ comprise pixel location end points of said shorter principal component;
  computing a centroid of said silhouette $C(t_n)$;
  computing a point of intersection $I(t_n)$ of said first principal components and said second principal component;
  computing a distance $D(t_n)$ between $C(t_n)$ and $I(t_n)$ normalized by a length of said first principal component;
  using a statistical T-test on a sequence $\{D(t_{n-Q}),\ldots,D(t_n)\}$ to test whether a mean of the normalized distances is greater than 0.5 or less than 0.3,
  wherein if the mean is greater than 0.5 then the angle α=0 and the pixel locations of the feature point are $(i_1,j_1)$ and $(i_2,j_2)$, and
  further wherein if the mean is less than 0.3 then the angle α=π/2 and the pixel location of the feature point are $(i_3,j_3)$ and $(i_4,j_4)$.

16. In the method of claim 14, said step of recursively calculating said range comprises the steps of:
  recursively calculating said range wherein said angle α=0 to obtain an estimated range $r_{\alpha=0}^{est}$ and an estimated velocity $V_{\alpha=0}^{est}$ and computing likelihoods $p_{range}(r_{\alpha=0}^{est})$ and $p_{speed}(V_{\alpha=0}^{est})$;
  recursively calculating said range where said angle α=π/2 to obtain an estimated range $r_{\alpha=\pi/2}^{est}$ and an estimated velocity $V_{\alpha=\pi/2}^{est}$ and computing likelihoods $p_{range}(r_{\alpha=\pi/2}^{est})$ and $p_{speed}(V_{\alpha=\pi/2}^{est})$; and
  computing $$L = \frac{p_{range}(r_{\alpha=0}^{est})p_{speed}(V_{\alpha=0}^{est})}{p_{range}(r_{\alpha=\pi/2}^{est})p_{speed}(V_{\alpha=\pi/2}^{est})}$$

where if L is greater than a threshold M then angle α=0 and the correct range is $r_{\alpha=0}^{est}$ and where if L is less than a threshold m then angle α=π/2 and the correct range is $r_{\alpha=\pi/2}^{est}$.

17. The method of claim 16 wherein M and m comprise positive real numbers such that m<M and M and wherein M and m are tunable design parameters.

18. In a computerized system including a camera mounted on a moving vehicle, wherein the camera acquires consecutively in real time a plurality of images of a moving object within a field of view of the camera, a method for determining a range of said moving object from said moving vehicle, the method comprising the steps of:
  detecting said moving object within each of said plurality of images;

identifying two feature points $p_1$ and $p_2$ on said detected object where $p_1$ and $p_2$ satisfy a predetermined geometric relationship with a velocity vector of said detected object, said predetermined geometric relationship comprising an assumption that the two feature points represent a leading point of the detected object and a trailing point of the detected object, said step of identifying said feature points $p_1$ and $p_2$ further comprising the step of determining pixel locations $(i_1,j_1)$ and $(i_2,j_2)$ of said feature points $p_1$ and $p_2$ within said image; and recursively calculating the range of said object based on changes in the positions of the feature points $p_1$ and $p_2$ in the sequential images and further based on said predetermined geometric relationship, said step of recursively calculating said range further comprising the step of converting said pixel locations to relative azimuth and elevation angles denoted by $\beta_1$, $\beta_2$, $\gamma_1$, $\gamma_2$, and wherein the step of recursively calculating said range comprises recursively calculating said range where a rotation matrix R is known and the following conditions are defined:

$(x_1, y_1, z_1)$ and $(x_2, y_2, z_2)$ represent 3D locations of said feature points $(i_1,j_1)$ and $(i_2,j_2)$;

[u, v, w] represents a 3D velocity vector of the object; and rotation matrix $R \in SO(3)$ is such that $(1/\|[u\ v\ w]\|)\ [u\ v\ w]^T = (1/\|[x_1\ x_2\ y_1 - y_2\ z_1\ z_2]\|)R[x_1\ x_2\ y_1 - y_2\ z_1 - z_2]^T$.

19. In a computerized system including a camera mounted on a moving vehicle, wherein the camera acquires consecutively in real time a plurality of images of a moving object within a field of view of the camera, a method for determining a range of said moving object from said moving vehicle, the method comprising the steps of:

detecting said moving object within each of said plurality of images;

identifying two feature points $p_1$ and $p_2$ on said detected object where $p_1$ and $p_2$ satisfy a predetermined geometric relationship with a velocity vector of said detected object, said predetermined geometric relationship comprising an assumption that the two feature points represent a leading point of the detected object and a trailing point of the detected object, said step of identifying said feature points $p_1$ and $p_2$ further comprising the step of determining pixel locations $(i_1,j_1)$ and $(i_2,j_2)$ of said feature points $p_1$ and $p_2$ within said image; and recursively calculating the range of said object based on changes in the positions of the feature points $p_1$ and $p_2$ in the sequential images and further based on said predetermined geometric relationship, said step of recursively calculating said range further comprising the step of converting said pixel locations to relative azimuth and elevation angles denoted by $\beta_1$, $\beta_2$, $\gamma_1$, $\gamma_2$, and wherein the step of recursively calculating said range comprises recursively calculating said range where an angle $\alpha$ is known and is equal to either 0 or $\pi/2$ radians, and the following conditions are defined:

$(x_1, y_1, z_1)$ and $(x_2, y_2, z_2)$ represent 3D locations of said feature points $(i_1,j_1)$ and $(i_2,j_2)$;

[u, v, w] represents a 3D velocity vector of the object; and angle $\alpha$ is the angle between the vectors [u v w] and $[x_1 - x_2\ y_1 - y_2\ z_1 - z_2]$.

20. In the method of claim 19, said step of determining pixel locations $(i_1,j_1)$ and $(i_2,j_2)$ comprising the steps of:

extracting a silhouette of said object comprising a plurality of pixels associated with said detected object;

extracting a first principal component of said silhouette comprising a first, longer straight line containing a maximum number of said pixels associated with said detected object where $(i_1,j_1)$ and $(i_2,j_2)$ comprise pixel location end points of said first principal component;

extracting a second principal component of said silhouette comprising a second, shorter straight line containing a maximum number of said pixels associated with said detected object where said second straight line makes an angle of greater than 45 degrees with said first straight line, and where $(i_3,j_3)$ and $(i_4,j_4)$ comprise pixel location end points of said shorter principal component;

computing a centroid of said silhouette $C(t_n)$;

computing a point of intersection $I(t_n)$ of said first principal components and said second principal component;

computing a distance $D(t_n)$ between $C(t_n)$ and $I(t_n)$ normalized by a length of said first principal component;

using a statistical T-test on a sequence $\{D(t_{n-Q}), \ldots, D(t_n)\}$ to test whether a mean of the normalized distances is greater than 0.5 or less than 0.3, wherein if the mean is greater than 0.5 then the angle $\alpha=0$ and the pixel locations of the feature point are $(i_1,j_1)$ and $(i_2,j_2)$, and further wherein if the mean is less than 0.3 then the angle $\alpha=\pi/2$ and the pixel location of the feature point are $(i_3,j_3)$ and $(i_4,j_4)$.

21. In the method of claim 19, said step of recursively calculating said range comprises the steps of:

recursively calculating said range wherein said angle $\alpha=0$ to obtain an estimated range $r_{\alpha=0}^{est}$ and an estimated velocity $V_{\alpha=0}^{est}$ and computing likelihoods $p_{range}(r_{\alpha=0}^{est})$ and $p_{speed}(V_{\alpha=0}^{est})$;

recursively calculating said range where said angle $\alpha=\pi/2$ to obtain an estimated range $r_{\alpha=\pi/2}^{est}$ and an estimated velocity $V_{\alpha=\pi/2}^{est}$ and computing likelihoods $p_{range}(r_{\alpha=\pi/2}^{est})$ and $p_{speed}(V_{\alpha=\pi/2}^{est})$; and computing $$L = \frac{p_{range}(r_{\alpha=0}^{est}) p_{speed}(V_{\alpha=0}^{est})}{p_{range}(r_{\alpha=\pi/2}^{est}) p_{speed}(V_{\alpha=\pi/2}^{est})}$$

where if L is greater than a threshold M then angle $\alpha=0$ and the correct range is $r_{\alpha=0}^{est}$ and where if L is less than a threshold m then angle $\alpha=\pi/2$ and the correct range is $r_{\alpha=\pi/2}^{est}$.

22. The method of claim 21 wherein M and m comprise positive real numbers such that m<M and M and wherein M and m are tunable design parameters.

\* \* \* \* \*